United States Patent
Lesso

(10) Patent No.: US 11,487,861 B2
(45) Date of Patent: *Nov. 1, 2022

(54) METHODS, APPARATUS AND COMPUTER-READABLE MEDIUMS RELATED TO BIOMETRIC AUTHENTICATION

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/167,913

(22) Filed: Feb. 4, 2021

(65) Prior Publication Data

US 2021/0157890 A1    May 27, 2021

Related U.S. Application Data

(63) Continuation of application No. 16/000,189, filed on Jun. 5, 2018, now Pat. No. 10,956,546.

(51) Int. Cl.
*G06F 21/32* (2013.01)
*H04R 1/10* (2006.01)

(52) U.S. Cl.
CPC ........... *G06F 21/32* (2013.01); *H04R 1/1091* (2013.01)

(58) Field of Classification Search
CPC ......... G06F 21/32; H04R 1/1091; G07C 9/37; G10L 25/60; G10L 25/51; G06V 40/10
See application file for complete search history.

(56) References Cited

U.S. PATENT DOCUMENTS

| | | | |
|---|---|---|---|
| 5,787,187 A | 7/1998 | Bouchard et al. | |
| 6,697,299 B2 | 2/2004 | Kato et al. | |
| 8,949,958 B1* | 2/2015 | Dixon | H04W 12/08 726/2 |
| 2002/0057805 A1* | 5/2002 | Kato | G06K 9/00 381/59 |
| 2005/0047610 A1* | 3/2005 | Reichel | H04R 29/006 381/77 |
| 2008/0262382 A1* | 10/2008 | Akkermans | G07C 9/37 600/559 |

(Continued)

OTHER PUBLICATIONS

International Search Report and Written Opinion of the International Searching Authority, International Application No. PCT/GB2019/051459, dated Sep. 23, 2019.

*Primary Examiner* — Meng Li
(74) *Attorney, Agent, or Firm* — Jackson Walker L.L.P.

(57) ABSTRACT

Embodiments of the disclosure provide a mechanism for performing a biometric algorithm on ear biometric data acquired from a user. The mechanism may be used for biometric authentication, or in-ear detect, for example. In one embodiment, a method is provided in which a quality metric of an input signal to a transducer and/or a signal on a return path from the transducer is monitored. One or more steps of a biometric process, comprising monitoring of a parameter related to an admittance of the transducer, comparison of the parameter to a stored profile for an authorised user, generation of a score based on the comparison, comparison of the score to one or more threshold values, and initiation of one or more actions, may be performed responsive to the quality metric meeting one or more criteria.

18 Claims, 4 Drawing Sheets

(56) References Cited

U.S. PATENT DOCUMENTS

| | | | | |
|---|---|---|---|---|
| 2009/0087003 A1* | 4/2009 | Zurek | .................... | G06V 40/10 |
| | | | | 704/E15.001 |
| 2010/0106975 A1* | 4/2010 | Vandervort | ......... | H04M 3/4936 |
| | | | | 713/186 |
| 2010/0328033 A1* | 12/2010 | Kamei | ................... | G06V 40/12 |
| | | | | 340/5.82 |
| 2011/0212717 A1* | 9/2011 | Rhoads | ............... | G06F 16/9537 |
| | | | | 455/418 |
| 2011/0228945 A1* | 9/2011 | Mihelich | .............. | H04R 29/001 |
| | | | | 381/59 |
| 2011/0314530 A1* | 12/2011 | Donaldson | ............ | H04L 9/3231 |
| | | | | 726/7 |
| 2017/0347180 A1* | 11/2017 | Petrank | ................... | G06F 3/165 |

* cited by examiner

METHODS, APPARATUS AND COMPUTER-READABLE MEDIUMS RELATED TO BIOMETRIC AUTHENTICATION

The present disclosure is a continuation of U.S. non-provisional patent application Ser. No. 16/000,189, filed Jun. 5, 2018, which is incorporated by reference herein in its entirety.

TECHNICAL FIELD

Embodiments of the present disclosure relate to biometric authentication, and particularly to methods, apparatus and computer-readable mediums for authentication and other techniques utilizing biometrics relating to a user's ear.

BACKGROUND

Biometric techniques are increasingly being used to authenticate users of electronic devices for the purpose of performing some restricted task. For example, fingerprint sensors are used in many personal electronic devices to authenticate users and unlock the device, authorise a financial transaction, etc. Voice biometric techniques may similarly be used to authenticate users, with the biometric authentication process being executed locally in the device, or remotely from the device (e.g., in the server of a bank or other company to which the user is attempting to gain access).

One area of biometrics which is less well known relates to a user's ear, and particularly the acoustic properties of a user's ear. For example, when earphones are placed on a user's ear, the ear canal (and/or the pinna or auricle) presents an acoustic impedance that is discriminative in a biometric sense. Users have subtly different ear and ear canal shapes, and the different shapes give rise to subtly different acoustic impedances (such as resonant frequencies, etc) which can be used to identify individuals.

One method of obtaining measurements of such "ear biometrics" is to generate an acoustic stimulus such as white noise or sinewaves in the vicinity of the user's ear, and then measure the acoustic response. For example, the speakers of a set of earphones may be controlled to generate such an acoustic stimulus, while microphones near the speakers (such as may be provided as part of an active noise cancellation system) may be used to detect the acoustic response.

An alternative approach to the acquisition of ear biometric measurements is set out in U.S. Pat. No. 6,697,299. The inventors of this patent recognized that the electrical impedance of the speakers will vary in accordance with the acoustic impedance of the user's ear when those speakers are placed on the user's ears. Thus when the speakers are controlled to emit an acoustic stimulus, the electrical impedance of the speakers can be measured, and this electrical impedance is used as a surrogate for the acoustic response of the user's ears. Such a system has the advantage that no microphones are needed, meaning that a wider variety of earphones can be used to acquire ear biometric data.

The disclosure in U.S. Pat. No. 6,697,299 teaches that the maximum number of people who can be authenticated by this method depends on the resolution with which the impedance of the loudspeaker is measured (in both magnitude and phase), and also the number of frequencies used in the acoustic stimulus. By increasing the measurement resolution and the number of frequencies in the acoustic stimulus, the theoretical maximum number of people who can be authenticated increases. The document further teaches that the acoustic response at lower frequencies, below 1 kHz, is most discriminative between different users.

There are a number of problems with this approach. One of the advantages of ear biometrics over other biometrics is that ear biometric requires no explicit actions on behalf of the user, beyond application of a set of earphones to the user's ears. In an ideal scenario, a user need not be aware that a biometrics process is taking place at all. However, an acoustic stimulus having frequencies below 1 kHz would inevitably be audible, leading to confusion, irritation or both.

SUMMARY

Embodiments of the present disclosure seek to address these and other problems.

In one aspect, there is provided a method, comprising: a) monitoring a parameter related to an admittance of an audio transducer of a personal audio device, the transducer being suitable for one or more of generating and monitoring pressure waves in the vicinity of a user's ear; b) comparing the monitored parameter to a stored profile for an authorised user; c) generating a score indicative of the similarity between the monitored parameter and the stored profile; d) comparing the score to one or more threshold values; and e) responsive to a positive comparison between the score and at least one of the one or more threshold values, performing one or more actions. The method further comprises: monitoring a quality metric of one or more of: an input signal to the transducer; and a signal on a return path from the transducer. One or more of steps a) to e) are performed responsive to a determination that the quality metric meets one or more criteria.

There is also provided a method comprising the steps of:
providing an audio transducer;
monitoring the impedance or the admittance of the audio transducer; and
comparing the monitored impedance or admittance against a stored impedance or admittance profile to authenticate a user,
wherein the method comprises the further step of:
monitoring a quality metric of a signal sent or received by the audio transducer,
wherein the step of comparing is performed responsive to the monitored quality metric satisfying a threshold.

In another aspect, the disclosure provides audio electronic circuitry, comprising: an admittance measurement device for monitoring a parameter related to an admittance of an audio transducer connectable to the audio electronic circuitry, the transducer being suitable for one or more of generating and monitoring pressure waves in the vicinity of a user's ear; a biometric authentication module configured to: compare the monitored parameter to a stored profile for an authorised user; generate a score indicative of the similarity between the monitored parameter and the stored profile; compare the score to one or more threshold values; and, responsive to a positive comparison between the score and at least one of the one or more threshold values, initiate one or more actions; and one or more quality filters configured to monitor a quality metric of one or more of an input signal to the transducer and a signal on a return path from the transducer. One or more of the monitoring of the parameter related to the admittance, the comparison of the monitored parameter to the stored profile, the generation of a score, the comparison of the score to one or more threshold values and the initiation of one or more actions are performed responsive to a determination that the quality metric meets one or more criteria.

In a further aspect, the disclosure provides audio electronic circuitry, comprising: an input for receiving an audio input signal to be provided to an audio transducer; an adaptive filter coupled to receive the audio input signal and configured to adapt so as to reduce an error signal representative of a difference between an output signal of the adaptive filter and a signal on a return path from the audio transducer, such that an admittance of the adaptive filter corresponds to an admittance of the audio transducer; a biometric authentication module configured to: receive a parameter related to the admittance of the adaptive filter; compare the parameter to a stored profile for an authorised user; generate a score indicative of the similarity between the parameter and the stored profile; compare the score to one or more threshold values; and, responsive to a positive comparison between the score and at least one of the one or more threshold values, initiate one or more actions.

BRIEF DESCRIPTION OF THE DRAWINGS

For a better understanding of the present disclosure, and to show how it may be put into effect, reference will now be made, by way of example, to the accompanying drawings, in which.

DETAILED DESCRIPTION

Figure 1:
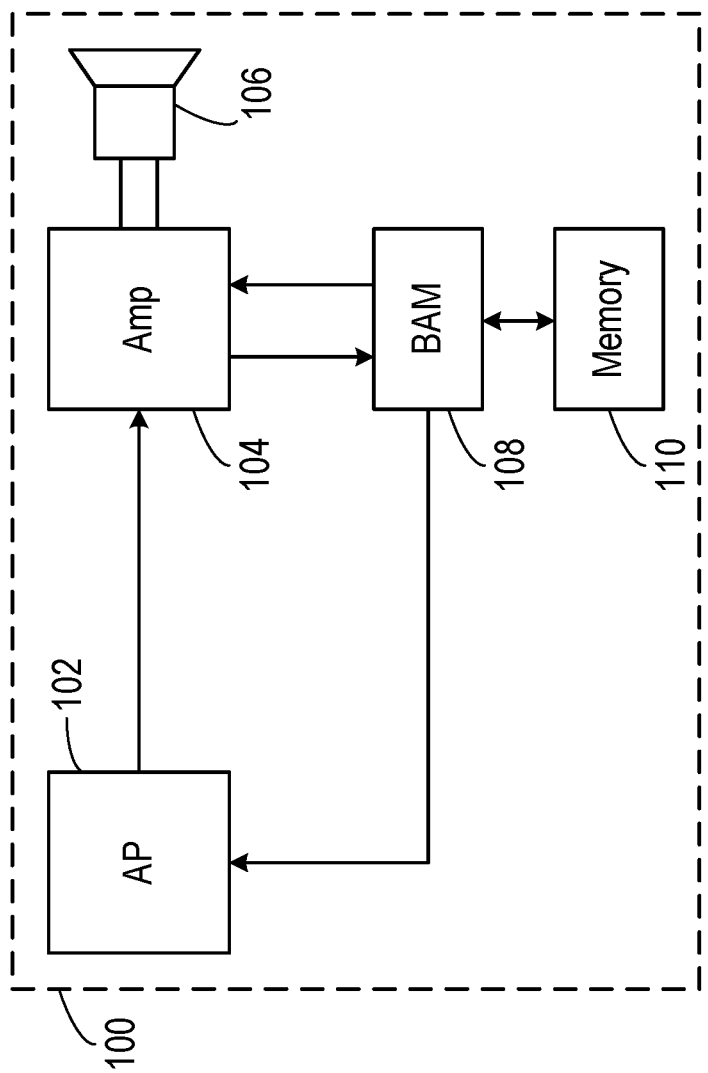
FIG. 1 is a schematic diagram of an electronic device arrangement according to embodiments of the disclosure.

FIG. 1 is a schematic diagram of an electronic device arrangement 100 according to embodiments of the disclosure. The arrangement 100 comprises a processor 102, amplifier circuitry 104, an audio transducer 106, a biometric authentication module 108 and memory 110.

The processor 102 (or more generally, processor circuitry) may be any general processor or applications processor (AP), or a combination of multiple processors. In the illustrated embodiment, the processor 102 provides an audio signal to the amplifier circuitry 104, which amplifies it and provides an amplified audio signal to the audio transducer 106 (in this embodiment, a loudspeaker).

The biometric authentication module 108 is coupled to the amplifier circuitry 104, and is operable to provide control signals to the amplifier circuitry 104 and to receive data and/or control signals from the amplifier circuitry 104. In one embodiment, the biometric authentication module 108 receives biometric data from the amplifier circuitry 104, and is operable to perform a biometric authentication algorithm on the biometric data. The biometric authentication module 108 is coupled to the memory 110, which stores profiles for one or more authorised users of the electronic device arrangement 100. The biometric authentication algorithm may comprise a comparison between the acquired biometric data (or features extracted therefrom) and the stored user profile(s) (or features extracted therefrom). Based on the comparison, the biometric authentication module 108 generates a score which is indicative of the similarity between the acquired biometric data and the stored user profile(s). The score is then compared to one or more threshold values, and a control signal generated comprising an indication of the outcome of the comparison. For example, in one embodiment the control signal comprises an indication that the acquired biometric data corresponds to that of an authorised user, or does not correspond to that of an authorised user (i.e., the user is confirmed as an authorised user, or is confirmed as not an authorised user). The control signal is output from the biometric authentication module 108 to the processor 102, which can then take one or more consequential actions (e.g., authorising or preventing performance of an otherwise restricted action, such as unlocking of an electronic device, execution of a financial transaction, etc).

The electronic device arrangement 100 may comprise or be implemented within a personal audio device which is configurable to provide audio playback to a single user when applied to that user's ear or ears. Suitable personal audio devices include a smartphone, a mobile or cellular phone, headphones, earphones, etc. Thus the audio transducer 106 may comprise a loudspeaker or microspeaker of a personal audio device.

Other components of the electronic device arrangement 100 may also be provided within the personal audio device, or in a host device which is coupled to the personal audio device. For example, in embodiments where the personal audio device has considerable processing power, such as a smartphone or similar, the components may all be provided within the personal audio device. In embodiments where the personal audio device has relatively little processing power, such as headphones or similar, one or more components may be provided in a host device (e.g., a smartphone, mobile or cellular phone, a computing device, etc) to which the personal audio device is coupled. For example, one or more of the processor 102, the biometric authentication module 108, the memory 110 and the amplification circuitry 104 may be provided in the host device.

Figure 2:
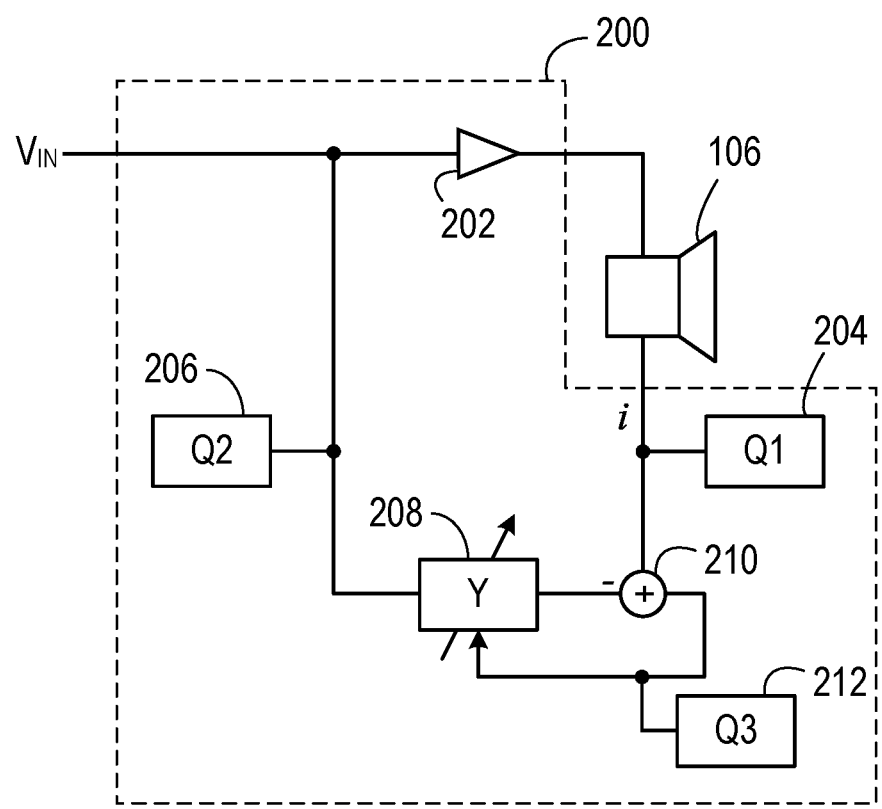
FIG. 2 is a schematic diagram of electronic circuitry for monitoring the impedance of a transducer according to embodiments of the disclosure.

FIG. 2 is a schematic diagram of electronic circuitry 200 for monitoring the admittance (or a related parameter) of a transducer according to embodiments of the disclosure. The electronic circuitry 200 may be implemented as the amplifier circuitry 104 described above with respect to FIG. 1, for monitoring the admittance of the transducer 106.

The circuitry 200 comprises an amplifier 202, connected to receive an input audio signal $V_{in}$ (such as the audio input signal provided by the processor 102). The amplifier 202 amplifies the input audio signal and outputs the amplified signal to an electrical input node of the transducer 106.

As noted above, the circuitry 200 is operative to determine the admittance of the transducer 106, or a parameter which is related to the admittance of the transducer 106. For example, those skilled in the art will appreciate that the inverse of admittance is impedance, and the circuitry may equivalently determine the admittance of the transducer 106 and obtain the same overall technical effect. Thus, as used herein, "a parameter related to the admittance" may be the admittance itself, or the impedance.

The admittance may be determined in a number of ways. In the illustrated embodiment, the circuitry utilizes an adaptive filter 208 to match the admittance of the transducer 106. In this regard, the adaptive filter 208 is coupled to receive the input signal $V_{in}$ and apply an admittance to that input signal in a similar manner to the transducer 106. The output of the adaptive filter 208 is provided to a subtracting element 210, which also receives the current i flowing in the transducer 106. The latter may be provided by connection to an electrical output node of the transducer 106. The subtracting element 210 subtracts one from the other (in the illustrated embodiment, the current flowing in the transducer 106 is subtracted from the current flowing in the adaptive filter 208), and outputs a signal which indicative of the difference, and thus indicative of the error between the admittance of the adaptive filter and the transducer. This error signal is fed back to adapt the coefficients of the filter 208, and so more closely match the admittance of the adaptive filter to that of the transducer 106, driving the error signal to a lower value. When the error signal is zero (or sufficiently close to zero), the admittance of the adaptive filter 208 (hereinafter Y) is matched to that of the transducer 106.

As noted above, the acoustic impedance of an ear can be useful as a biometric for discriminating between different users. When applied to an ear of a user, the electrical admittance of the transducer 106 depends on the acoustic impedance of the ear, and thus the electrical admittance or impedance of the transducer 106 is itself useful as a biometric for discriminating between different users. Thus the admittance Y of the transducer (e.g., as determined using the adaptive filter 208) may be provided from the circuitry 200 to a biometric authentication module (e.g., the biometric authentication module 108 described above with respect to FIG. 1).

In U.S. Pat. No. 6,697,299, a loudspeaker is driven by an acoustic stimulus comprising a number of different frequencies. The effectiveness of the biometric authentication is increased by increasing the number of different frequencies in the acoustic stimulus. Further, it is taught that the acoustic response at lower frequencies, below 1 kHz, is most discriminative between users. However, such a test signal is likely to be audible to the user.

According to embodiments of the present disclosure, no specific test signal or acoustic stimulus is required in order to obtain reliable biometric data. For example, the circuitry 200 may instead be provided with the input audio signals which arise through the user's normal use of the electronic device arrangement 100 (e.g., music, system sounds, voice sounds, etc). Additionally or alternatively, the circuitry 200 may be provided with no audio input signal. In this case, the transducer 106 (e.g., the loudspeaker) effectively monitors the background acoustic noise. When the transducer 106 is applied to the user's ear, the transducer 106 monitors the background acoustic noise which is present in the user's ear canal.

Thus, according to embodiments of the disclosure, the user is not presented with a confusing or irritating test signal acoustic stimulus. However, in order to ensure that the biometric data is valid, the circuitry 200 comprises one or more quality filters 204, 206, 212 operable to monitor spectrum quality metric of the input audio signal $V_{in}$ and/or the received signal detected by the transducer 106. Biometric authentication may be carried out responsive to a determination that the quality metric of the input audio signal $V_{in}$ and/or the received signal detected by the transducer 106 meets one or more criteria.

For example, as noted in U.S. Pat. No. 6,697,299, the biometric algorithm is more effective when data is obtained at a variety of different frequencies. Accordingly, in one embodiment the quality metric comprises the power spectrum of the input audio signal $V_{in}$ and/or the received signal detected by the transducer 106. One of the criteria in such an embodiment may therefore relate to a determination that the power spectrum of the input audio signal $V_{in}$ and/or the received signal detected by the transducer 106 comprises sufficient energy or power, at least at frequencies which are discriminative between different users. Frequencies which may be discriminative between different users include frequency bands between approximately 1 kHz and approximately 3 kHz; between approximately 5 kHz and approximately 7 kHz; and between approximately 10 kHz and approximately 12 kHz. The power spectrum may be monitored across a wide range of frequency (e.g., audible frequencies) that includes such discriminative frequency bands, or may be monitored only at the discriminative frequency bands.

In another embodiment, the quality metric additionally or alternatively comprises an amplitude of the input audio signal $V_{in}$ and/or the received signal detected by the transducer 106. One of the criteria in such an embodiment may therefore relate to a determination that the amplitude of the input audio signal $V_{in}$ and/or the received signal detected by the transducer 106 is sufficiently high (e.g., above a threshold value) that the biometric process which is to be subsequently carried out will be reliable.

In a further embodiment, the quality metric additionally or alternatively comprises an activity rate of the input audio signal $V_{in}$ and/or the received signal detected by the transducer 106. The activity rate may comprise or vary as a function of a zero-crossing rate. One of the criteria in such an embodiment may therefore relate to a determination that the activity of the input audio signal $V_{in}$ and/or the received signal detected by the transducer 106 is sufficiently high (e.g., above a threshold value) that the biometric process which is to be subsequently carried out will be reliable.

A first quality filter 204 (labelled herein "Q1") may be coupled to the electric output node of the transducer 106 and is therefore operative to receive the current i flowing through the transducer 106. The Q1 filter 204 thus receives and can monitor the power spectrum of a signal which is indicative of the acoustic background noise detected by the transducer 106 and, if an audio input signal is output to the transducer 106, also indicative of the acoustic input signal. A second quality filter 206 (labelled herein "Q2") may be coupled to receive the audio input signal prior to its playback by the transducer 106. The Q2 filter 206 is therefore operative to monitor the power spectrum of the audio input signal. The Q2 filter 206 may be able to detect the audio input signal with a greater signal-to-noise ratio than the Q1 filter 204.

In embodiments comprising both Q1 and Q2 filters, 204, 206, the filters may be used in combination to detect faults. For example, if the transducer 106 is driven by an audio input signal, this is detected by the Q2 filter 206. If the audio input signal is not detected by the Q1 filter 204, this is an indication of a fault as the transducer 106 has not played back the audio. Thus, in one embodiment, the signals monitored by the Q1 and Q2 filters 204, 206 may be compared in order to detect the presence of faults in the playback path to and from the transducer 106.

A third quality filter 212 (labelled herein "Q3") may be coupled to monitor the error signal output from the subtracting element 210. When the error signal is equal to zero (or approaches zero), the adaptive filter 208 has adapted to match the admittance of the transducer 106. The Q3 filter 212 may thus monitor the error signal and detect when it has reached or is approaching zero, as an indication that the adaptive filter 208 has adapted. For example, the Q3 filter 212 may compare the error signal to a threshold value, and output an indication that the adaptive filter 208 has adapted upon determining that the error signal is equal to or less than the threshold value.

The quality filters 204, 206 may be implemented in a number of different ways. For example, in one embodiment, the quality filters are configured to perform a Fourier transform on the received signal in order to determine the power or energy in the signal at each of a plurality of acoustic frequencies. In another embodiment, the filters may comprise a plurality of band-pass filters, each arranged to pass a different frequency band of interest (e.g., a frequency band which is discriminative between different users). The power or energy at each frequency band may be determined by determining the power of the band-pass filtered signals.

In embodiments relating to the power spectrum of the input audio signal $V_{in}$ and/or the received signal detected by the transducer 106, the Q1 and Q2 quality filters 204, 206 may compare the energy or power at each frequency to a threshold to determine if sufficient energy is present at that frequency. In one embodiment, the threshold may be chosen so as to reflect 30 dB sound power level at each frequency.

In one embodiment, the criterion may be passed only if the energy in the power spectrum exceeds the threshold at all frequencies of interest (e.g., discriminative frequencies). In other embodiments, the criterion maybe passed if the energy in the power spectrum exceeds the threshold at a certain number (i.e. a subset) of the frequencies of interest.

Thus one criterion relates to the energy or power of the power spectrum at certain frequencies, and ensures that sufficient energy is present in order to distinguish reliably between different users. This is important if no predetermined acoustic stimulus is to be provided (and thus the frequencies of the background noise or the audio input signal are not known in advance). As noted above, alternative or additional criteria relate to the amplitude and activity rate of the input audio signal $V_{in}$ and/or the received signal detected by the transducer 106.

The action of the circuitry 200 described above with respect to FIG. 2 is to force the adaptive filter 208 to adapt to the admittance of the transducer 106 according to the following equation:

$$i = YV (Y = 1/Z)$$

where i is the current flowing in the transducer 106, V is the input audio signal (or a reference voltage where no input audio signal is provided) and Y is the admittance of the adaptive filter 208.

In order to provide biometric authentication, a user first undergoes a process of enrolment in which an audio input signal is provided (e.g. music or a test signal such as white noise) and the admittance of the transducer 106 determined (e.g. using the adaptive filter 208). This admittance $Y_{user}$ is stored (e.g. in the memory 110) and becomes the stored template associated with the authorised user.

At a future occasion, when the user wishes to be authenticated (or some other process initiates biometric authentication), the admittance of the transducer 106 is again measured $Y_{measured}$. The biometric authentication module 108 compares the measured admittance $Y_{measured}$ to the stored admittance $Y_{user}$ (or the stored admittances if more than one user is enrolled with the device) and determines the mathematical difference between the admittances. If the difference is sufficiently low (e.g. lower than a threshold), then the user may be authenticated or some other action taken.

Figure 3:
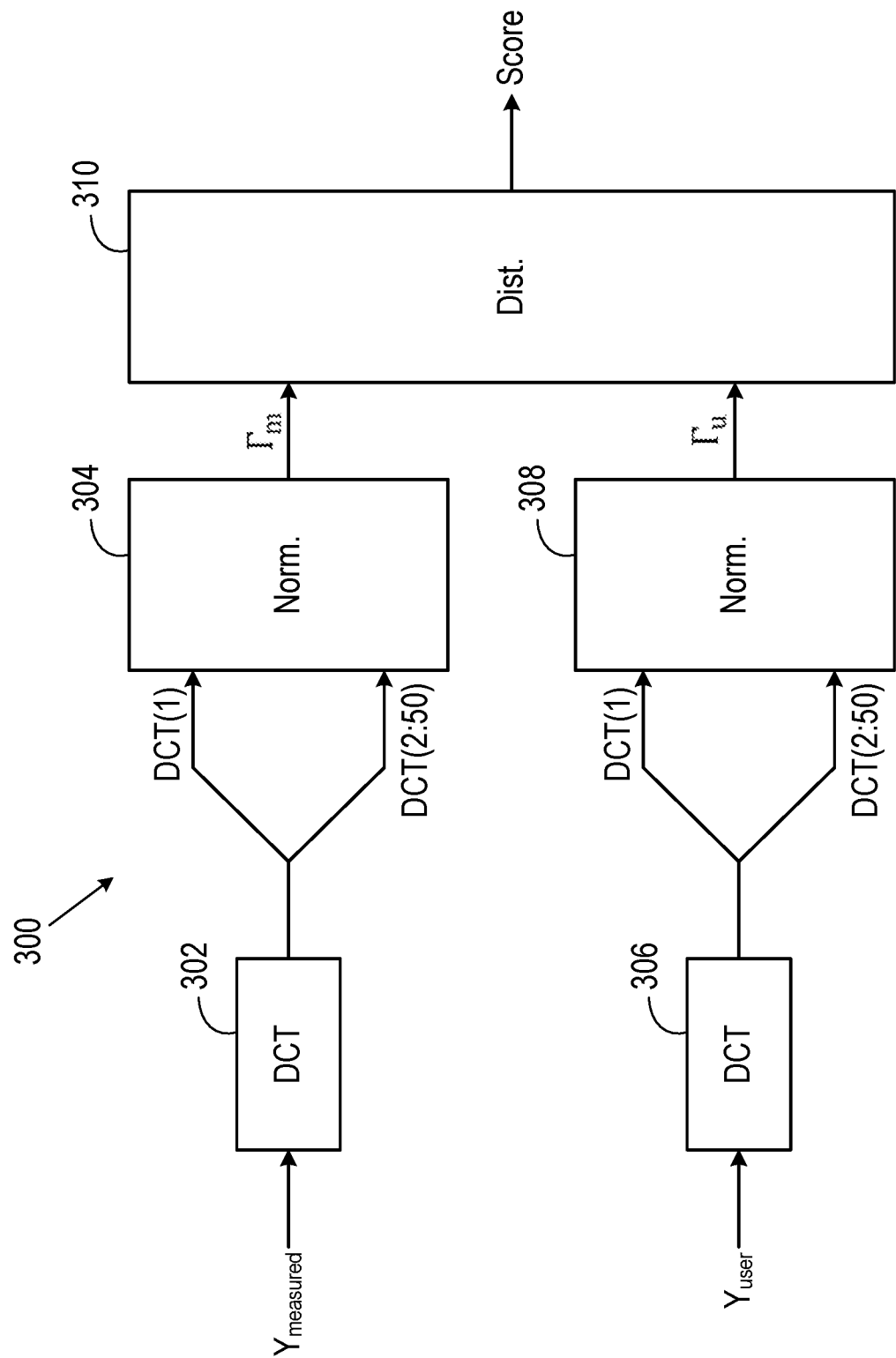
FIG. 3 is a schematic diagram of a process flow in a biometric authentication module according to embodiments of the disclosure.

FIG. 3 is a schematic diagram of a process flow 300 in a biometric authentication module according to embodiments of the disclosure, illustrating one method of determining the difference between a measured admittance $Y_{measured}$ and a stored admittance $Y_{user}$. The process flow 300 may be implemented in the biometric authentication module 108 described above with respect to FIG. 1, for example.

The measured admittance $Y_{measured}$ is compressed in a first converter 302. In the illustrated embodiment, the first converter 302 is implemented as a discrete cosine transform (DCT); however, those skilled in the art will appreciate that alternative compression methods may be performed, such as Principal Component Analysis (PCA), Karhunen-Loéve theorem (KLT).

The output of the first converter 302 is thus a plurality of components or data points, each representing the power level to be associated with cosine functions oscillating at different frequencies. These data points may be considered as a vector. In the illustrated embodiment, the vector comprises fifty such data points, although those skilled in the art will appreciate that fewer or more data points may be determined to provide lesser or greater granularity to the measurement and thus accuracy to the authentication process.

According to embodiments of the disclosure, only a subset of the data points may be compared to determine the difference between the measured admittance $Y_{measured}$ and the stored admittance $Y_{user}$. One or more data points not used in the comparison may be used to normalize the frequency component values.

For example, in the illustrated embodiment, the data point associated with the largest term of the DCT may not be used to compare the measured admittance $Y_{measured}$ and the stored admittance $Y_{user}$, but instead be provided as an input to a normalization function or module 304 to normalize one or more values which are used in the comparison. For example, the normalization function 304 may implement the following function:

$$\Gamma_m = \frac{DCT(2:50)}{DCT(1)}$$

where $\Gamma_m$ is the normalized output vector, and wherein DCT(n) is the nth data point output from the first converter 302.

A similar process is carried out on the stored admittance data $Y_{user}$. That is, the data is provided to a second converter 306 for conversion to enable comparison with the measured data. Again, the second converter 306 may implement a discrete cosine transform or any other suitable transform. The second converter 306 outputs a series of data points corresponding to a sum of cosine functions oscillating at different frequencies which is input to a second normalization function 308, and the second normalization function 308 outputs a normalized user admittance vector $\Gamma_u$.

The normalized admittance vectors are provided to a difference scoring function 310, which compares the two vectors and determines the distance between them. As noted above, in one embodiment the data point associated with the largest cosine value (e.g. DCT(1)) is not utilized for the comparison. In further embodiments, one or more data points associated with higher powers may also be omitted from the admittance vectors provided for comparison in the difference scoring function 310. In one embodiment, therefore, the normalized admittance vectors may comprise only a subset of the power data points output from the converters 302, 306 (once normalized), including neither the data points associated with the lowest or highest powers.

The difference scoring function 310 may implement any suitable algorithm in order to determine the mathematical distance between the normalized measured admittance vector $\Gamma_m$ and the normalized user admittance vector $\Gamma_u$. In one embodiment, the difference scoring function 310 may determine the cosine similarity between the two vectors, as follows:

$$dist. = \frac{\langle \Gamma_m - \overline{\Gamma_m}, \Gamma_u - \overline{\Gamma_u} \rangle}{\|\Gamma_m\|\|\Gamma_u\|}$$

where $\overline{\Gamma_m}$ is the mean value of the normalized measured admittance vector, $\overline{\Gamma_u}$ is the mean value of the normalized user admittance vector, and $\|\bullet\|$ represents the magnitude of the enclosed vector.

Thus the process flow 300 outputs a value or score which is indicative of the similarity between the measured admittance $Y_{measured}$ and the stored admittance $Y_{user}$ of an authorised user. The biometric authentication module 108 may compare this score to one or more thresholds to determine an outcome of the biometric authentication process.

For example, in one embodiment, the score may be compared to a first threshold value in order to determine whether the user providing the input (i.e. the user who was measured) should be authenticated as an authorised user. The first threshold value may therefore be set to provide a relatively strict authentication process. For example, if the score corresponds to the difference between the admittances, the threshold may be set to be relatively low.

Additionally or alternatively, the score may be compared to a second threshold value in order to determine whether the measured admittance corresponds to an ear (i.e., any ear) or not. In this case, the biometric authentication module 108 may be utilized as an in-ear detect module, operable to detect when the transducer 106 has been applied to a person's ear. Such in-ear detect detection may be utilized in a variety of different ways, such as to control audio playback settings (e.g., to pause playback upon removal of the transducer 106 from a person's ears, or to commence playback upon application of the transducer 106 to a person's ears), to alter a power state of the circuitry (e.g., to move to a low-power or sleep state upon removal of the transducer 106 from a person's ears, or to move to a high-power or awake state upon application of the transducer 106 to a person's ears), etc. The second threshold value may be set at a less strict value, to reflect that the authentication process in this case does not require the measured user to be an authorised user. For example, if the score corresponds to the difference between the admittances, the threshold may be set to be relatively high (e.g., higher than the first threshold value).

Figure 4:
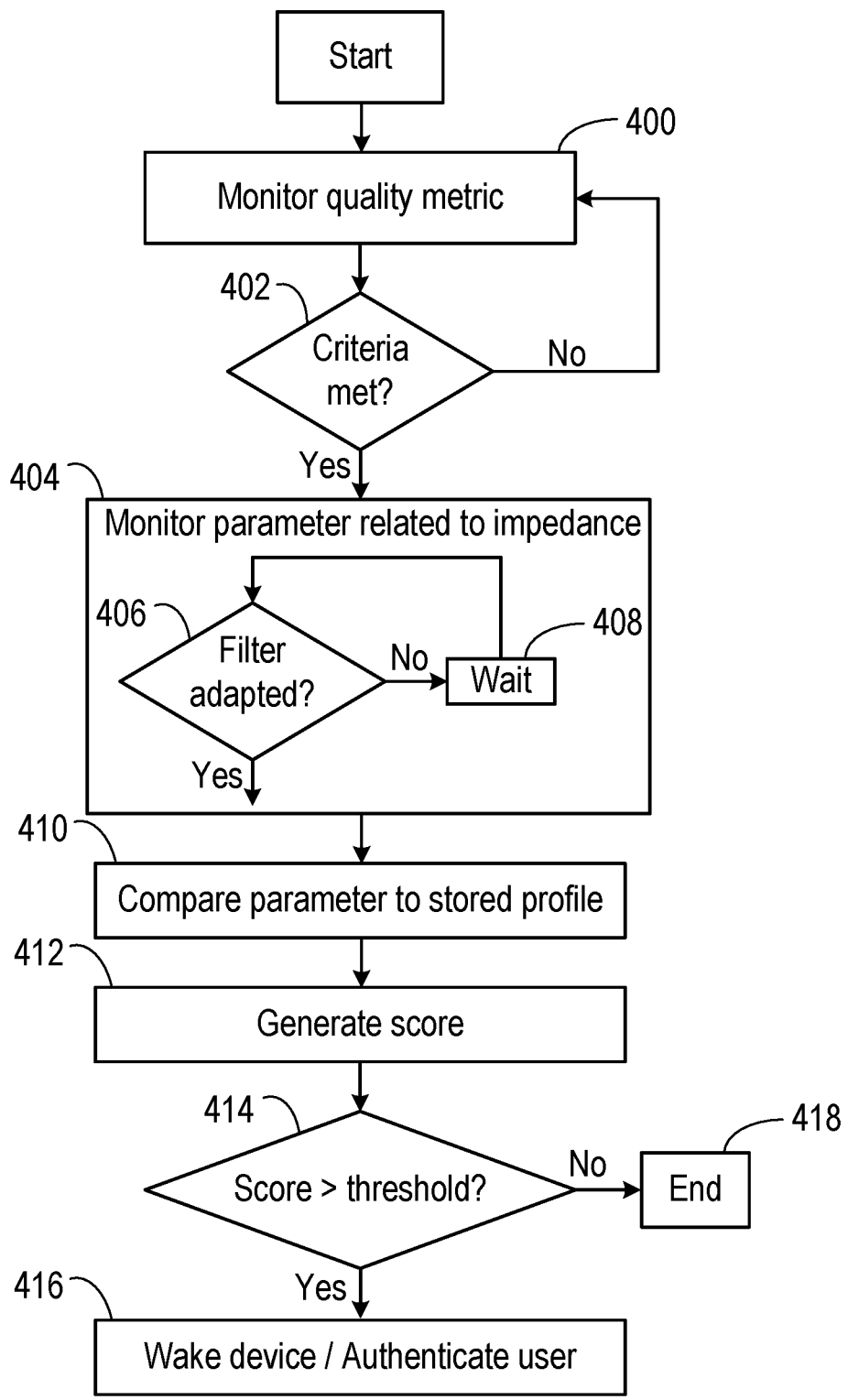
FIG. 4 is a flowchart of a method according to embodiments of the disclosure.

FIG. 4 is a flowchart of a method according to embodiments of the disclosure. The method may be implemented using the circuitry and processes described above with respect to any one or more of FIGS. 1, 2 and 3.

The method begins in step 400, in which a quality metric (e.g., the power spectrum, the amplitude, the activity rate, etc) of an audio input signal for a transducer, and/or a signal on a return path from the transducer, is monitored. For example the signal on the return path from the transducer may be monitored by a quality filter (such as the Q1 filter 204 described above). This signal may be indicative of the acoustic background noise detected by the transducer and, if an audio input signal is output to the transducer, also indicative of the audio input signal. The audio input signal may be monitored by an alternative or additional filter (such as the Q2 filter 206 or Q3 filter 212 described above) coupled to receive the audio input signal prior to its playback by the transducer.

Where the quality metric comprises a power spectrum, this may be monitored in a variety of ways. For example, a Fourier transform may be performed on the received signal in order to determine the power or energy in the signal at each of a plurality of acoustic frequencies. In another embodiment, a plurality of band-pass filters may be used, each arranged to pass a different frequency band of interest (e.g., a frequency band which is discriminative between different users). The power or energy at each frequency band may be determined by determining the power of the band-pass filtered signals.

In step 402, it is determined whether the monitored quality metric (or metrics) meets one or more criteria.

One of the criteria may relate to a determination that the power spectrum of the input audio signal $V_{in}$ and/or the received signal detected by the transducer comprises sufficient energy or power, at least at frequencies which are discriminative between different users. Frequencies which may be discriminative between different users include frequency bands between approximately 1 kHz and approximately 3 kHz; between approximately 5 kHz and approximately 7 kHz; and between approximately 10 kHz and approximately 12 kHz. The power spectrum may be monitored across a wide range of frequency (e.g., audible frequencies) that includes such discriminative frequency bands, or may be monitored only at the discriminative frequency bands.

The energy or power at each frequency may be compared to a threshold to determine if sufficient energy is present at that frequency. In one embodiment, the threshold may be chosen so as to reflect 30 dB sound power level at each frequency.

In one embodiment, the criterion may be passed only if the energy in the power spectrum exceeds the threshold at all frequencies of interest (e.g., discriminative frequencies). In other embodiments, the criterion may be passed if the energy in the power spectrum exceeds the threshold at a certain number (i.e. a subset) of the frequencies of interest.

Thus one criterion relates to the energy or power of the power spectrum at certain frequencies, and ensures that sufficient energy is present in order to distinguish reliably between different users. This is important if no predetermined acoustic stimulus is to be provided (and thus the frequencies of the background noise or the audio input signal are not known in advance).

In another embodiment, the quality metric additionally or alternatively comprises an amplitude of the input audio signal $V_{in}$ and/or the received signal detected by the transducer 106. One of the criteria in such an embodiment may therefore relate to a determination that the amplitude of the input audio signal $V_{in}$ and/or the received signal detected by the transducer 106 is sufficiently high (e.g., above a threshold value).

In a further embodiment, the quality metric additionally or alternatively comprises an activity rate of the input audio signal $V_{in}$ and/or the received signal detected by the transducer 106. The activity rate may comprise or vary as a function of a zero-crossing rate. One of the criteria in such an embodiment may therefore relate to a determination that the activity of the input audio signal $V_{in}$ and/or the received signal detected by the transducer 106 is sufficiently high (e.g., above a threshold value).

If the one or more criteria are not met, the method returns to step 400 and the quality metric continues to be monitored. If the one or more criteria are met, the method proceeds to step 404, in which a parameter related to the admittance of the transducer is monitored. In one embodiment, the parameter is the admittance; in another embodiment, the parameter may be the impedance, for example.

Step 404 may be implemented in a variety of different ways. In one embodiment, an adaptive filter is provided, and coupled to receive the audio input signal (if any) that is provided to the transducer. The difference between the output of the adaptive filter and the electrical output of the transducer is used in a feedback loop to adapt the coefficients of the filter and so drive the difference (i.e. an error signal) to zero. Once the difference is zero, the impedance or admittance of the adaptive filter matches that of the transducer. This process may take several iterations and thus, in one embodiment, step 404 comprises the substeps of determining whether the filter has adapted (step 406) and, if not, waiting an amount of time (step 408). The determination in step 406 may be made using the Q3 filter 212 described above, for example.

Once the filter has adapted, or the impedance of the transducer has otherwise been determined, the method proceeds to step 410 in which the measured parameter is compared to a stored profile for an authorised user, and step 412 in which a score indicative of the similarity between the measured parameter and the stored profile is generated. These steps are described in some detail above, with respect to FIG. 3.

In step 414, the score is compared to one or more thresholds. The thresholds may comprise one or more of: a first threshold value for distinguishing between an ear of an authorised user and an ear of an unauthorised user; and a second threshold value for distinguishing between an ear (e.g., any ear) and a non-ear. The second threshold value may be less strict (i.e., require a less close match between the measured parameter and the stored profile) than the first threshold value.

In embodiments when the score is compared to multiple threshold values, the score may be compared to different threshold values successively. For example, the score may first be compared to the second threshold value to determine if an ear is present. If no ear is present, a comparison to the first threshold value need not take place. If an ear is determined to be present, a comparison to the first threshold value may then take place. Additional data may be acquired for the purposes of comparison to the first threshold value, reflecting the additional confidence required if a user is to be authenticated as an authorised user. Thus in this case the score may be adapted between comparison with the second and first threshold values.

If the comparison in step 414 is negative, the method ends in step 418, without authenticating the user as an authorised user or determining that the transducer has been placed on an ear.

If the comparison in step 414 is positive, the method proceeds to step 416, in which one or more actions are performed based on the positive comparison. For example, if the score is successfully compared to the second threshold value, it may be determined that the transducer has been applied to a person's ear. Such in-ear detect detection may be utilized in a variety of different ways, such as to control audio playback settings (e.g., to pause playback upon removal of the transducer 106 from a person's ears, or to commence playback upon application of the transducer 106 to a person's ears), to alter a power state of the circuitry (e.g., to move to a low-power or sleep state upon removal of the transducer 106 from a person's ears, or to move to a high-power or awake state upon application of the transducer 106 to a person's ears), etc.

If the score is successfully compared to the first threshold value, the user may be authenticated as an authorised user. Such authentication may be used to permit or authorise an otherwise restricted action, such as unlocking of an electronic device (such as the host device), access to one or more restricted applications, execution of a financial transaction, etc.

Execution of the method of FIG. 4 is thus subject to the determination, in step 402, that the monitored quality metric of the input audio signal and/or the received signal from the transducer meets one or more criteria. In the illustrated embodiment, this step is performed at the start of the method, and thus all following steps are subject to the quality metric meeting the one or more criteria. In this way, power that would otherwise be consumed (e.g., in adapting the filter, generating a score, etc) can be saved. However, those skilled in the art will appreciate that significant benefits will still accrue by performing step 402 at a later stage of the method. Thus, the quality metric may be checked for compliance with the one or more criteria subsequent to adaptation of the filter, generation of the score, or even comparison of the score to the thresholds. In the latter case, the output of the comparison may be qualified, adapted or nullified, if the one or more criteria are not met. The use of confusing or irritating acoustic stimuli to generate the biometric data can still be avoided.

Step 402 may be performed by the quality filters directly, or some logic circuitry or processing circuitry coupled to the quality filters (e.g. the biometric authentication module 108), for example.

Thus embodiments of the disclosure provide a mechanism for performing a biometric algorithm on ear biometric data acquired from a user. The mechanism may be used for biometric authentication, or in-ear detect, for example.

Embodiments described above have focused on an implementation in which ear biometrics are performed on signals detected in a single ear. It will be appreciated by those skilled in the art that the embodiments may straightforwardly be adapted to take into consideration biometric data obtained from both ears of a user. Thus, where the description above discloses acquiring data from an ear, data may similarly be acquired from two ears. Biometric algorithms may similarly be performed on data from both ears, and this may be combined as described above, i.e. separate biometric authentication scores combined to form a combined score on which an overall decision is determined, or separate biometric authentication decisions which are then combined to determine an overall decision.

Embodiments may be implemented in an electronic, portable and/or battery powered host device such as a smartphone, an audio player, a mobile or cellular phone, or a handset. Embodiments may be implemented on one or more integrated circuits provided within such a host device. Embodiments may be implemented in a personal audio device configurable to provide audio playback to a single person, such as a smartphone, a mobile or cellular phone, headphones, earphones. Again, embodiments may be implemented on one or more integrated circuits provided within such a personal audio device. In yet further alternatives, embodiments may be implemented in a combination of a host device and a personal audio device. For example, embodiments may be implemented in one or more integrated circuits provided within the personal audio device, and one or more integrated circuits provided within the host device.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

The invention claimed is:

1. A method, comprising:
   a) monitoring a parameter related to an admittance of an audio transducer of a personal audio device, the transducer being suitable for one or more of generating and monitoring pressure waves in the vicinity of a user's ear;
   b) comparing the monitored parameter to a stored profile for an authorised user;
   c) generating a score indicative of the similarity between the monitored parameter and the stored profile;
   d) comparing the score to one or more threshold values; and
   e) responsive to a positive comparison between the score and at least one of the one or more threshold values, performing one or more actions,
   further comprising:
   monitoring a quality metric of one or more of:
      an input signal to the transducer; and
      a signal on a return path from the transducer,
   wherein one or more of steps a) to e) are performed responsive to a determination that the quality metric meets one or more criteria, wherein the one or more criteria comprise a criterion that a power of one or more of the input signal and the signal on the return path is above one or more second threshold values at one or more frequencies in the range of one or more of: 1 kHz to 3 kHz; 5 kHz to 7 kHz; and 10 kHz to 12 kHz.

2. The method according to claim 1, wherein the one or more criteria comprise a criterion that a power of one or more of the input signal and the signal on the return path is above one or more second threshold values at one or more frequencies of interest.

3. The method according to claim 1, wherein the one or more criteria comprise a criterion that an amplitude of one or more of the input signal and the signal on the return path is above a third threshold value.

4. The method according to claim 1, wherein the one or more criteria comprise a criterion that an activity rate of one or more of the input signal and the signal on the return path is above a fourth threshold value.

5. Audio electronic circuitry, comprising:
   an admittance measurement device for monitoring a parameter related to an admittance of an audio transducer connectable to the audio electronic circuitry, the transducer being suitable for one or more of generating and monitoring pressure waves in the vicinity of a user's ear;
   a biometric authentication module configured to:
      compare the monitored parameter to a stored profile for an authorised user;
      generate a score indicative of the similarity between the monitored parameter and the stored profile;
      compare the score to one or more threshold values; and
      responsive to a positive comparison between the score and at least one of the one or more threshold values, initiate one or more actions; and
   one or more quality filters configured to monitor a quality metric of one or more of an input signal to the transducer and a signal on a return path from the transducer,
   wherein one or more of the monitoring of the parameter related to the admittance, the comparison of the monitored parameter to the stored profile, the generation of a score, the comparison of the score to one or more threshold values and the initiation of one or more actions are performed responsive to a determination that the quality metric meets one or more criteria, wherein the one or more criteria comprise a criterion that a power of one or more of the input signal and the signal on the return path is above one or more second threshold values at one or more frequencies in the range of one or more of: 1 kHz to 3 kHz; 5 kHz to 7 kHz; and 10 kHz to 12 kHz.

6. The audio electronic circuity according to claim 5, wherein the one or more threshold values comprise a first threshold value set to a value suitable for discriminating between the authenticated user and other users.

7. The audio electronic circuity according to claim 6, wherein the one or more actions comprises authenticating the user as the authenticated user.

8. The audio electronic circuity according to claim 5, wherein the one or more threshold values comprise a second threshold value set to a value suitable for discriminating between ears and non-ears.

9. The audio electronic circuity according to claim 8, wherein the one or more actions comprises setting a flag to indicate that the personal audio device is in an on-ear condition.

10. The audio electronic circuity according to claim 5, wherein the quality metric comprises one or more of the following: a power spectrum of a signal, an amplitude level of a signal, and an activity rate of a signal.

11. The audio electronic circuity according to claim 5, wherein frequencies of interest are frequencies at which the power spectrum differs as between different users of the personal audio device.

12. The audio electronic circuity according to claim 5, wherein the one or more criteria comprise a criterion that an amplitude of one or more of the input signal and the signal on the return path is above a third threshold value.

13. The audio electronic circuity according to claim 5, wherein the one or more criteria comprise a criterion that an activity rate of one or more of the input signal and the signal on the return path is above a fourth threshold value.

14. The audio electronic circuity according to claim 5, wherein the admittance measurement device comprises an adaptive filter arranged to receive the input signal, and to adapt based on an error signal indicative of a difference between an output of the adaptive filter and an electrical output of the transducer.

15. The audio electronic circuity according to any one of claim 5, wherein the score is generated by transforming the monitored parameter into a plurality of frequency components, and comparing at least a subset of the plurality of frequency components to a corresponding subset of frequency components of the stored profile.

16. The audio electronic circuity according to claim 15, wherein at least one of the plurality of frequency components is used to normalize the subset of the plurality of frequency components.

17. An electronic device arrangement, comprising:
    a personal audio device; and
    the audio electronic circuitry according to claim 5.

18. The electronic device arrangement according to claim 17, wherein the audio electronic device circuitry is arranged at least partially within a host device to which the personal audio is coupled.

* * * * *

UNITED STATES PATENT AND TRADEMARK OFFICE
CERTIFICATE OF CORRECTION

PATENT NO. : 11,487,861 B2
APPLICATION NO. : 17/167913
DATED : November 1, 2022
INVENTOR(S) : John Paul Lesso It is certified that error appears in the above-identified patent and that said Letters Patent is hereby corrected as shown below:

In the Claims

1. In Column 14, Line 29, in Claim 6, delete "circuity" and insert -- circuitry --, therefor.

2. In Column 14, Line 33, in Claim 7, delete "circuity" and insert -- circuitry --, therefor.

3. In Column 14, Line 36, in Claim 8, delete "circuity" and insert -- circuitry --, therefor.

4. In Column 14, Line 40, in Claim 9, delete "circuity" and insert -- circuitry --, therefor.

5. In Column 14, Line 42, in Claim 9, delete "the personal audio device" and insert -- a personal audio device --, therefor.

6. In Column 14, Line 44, in Claim 10, delete "circuity" and insert -- circuitry --, therefor.

7. In Column 14, Line 48, in Claim 11, delete "circuity" and insert -- circuitry --, therefor.

8. In Column 14, Lines 50-51, in Claim 11, delete "the personal audio device." and insert -- a personal audio device. --, therefor.

9. In Column 14, Line 52, in Claim 12, delete "circuity" and insert -- circuitry --, therefor.

10. In Column 14, Line 56, in Claim 13, delete "circuity" and insert -- circuitry --, therefor.

11. In Column 14, Line 60, in Claim 14, delete "circuity" and insert -- circuitry --, therefor.

12. In Column 14, Line 66, in Claim 15, delete "circuity" and insert -- circuitry --, therefor.

13. In Column 14, Line 66, in Claim 15, delete "to any one of" and insert -- to --, therefor.

Signed and Sealed this
Twenty-first Day of February, 2023

*Katherine Kelly Vidal*

Katherine Kelly Vidal
*Director of the United States Patent and Trademark Office*

CERTIFICATE OF CORRECTION (continued)
U.S. Pat. No. 11,487,861 B2

14. In Column 15, Line 5, in Claim 16, delete "circuity" and insert -- circuitry --, therefor.

15. In Column 15, Line 15, in Claim 18, delete "audio" and insert -- audio device --, therefor.